Nov. 2, 1965    R. J. BLACK    3,215,185
FLUID DENSITY AND VISCOSITY SENSOR AND CONTROL
Filed April 2, 1963    2 Sheets-Sheet 1

INVENTOR:
ROBERT J. BLACK
BY Howson & Howson
ATTYS.

Nov. 2, 1965   R. J. BLACK   3,215,185
FLUID DENSITY AND VISCOSITY SENSOR AND CONTROL
Filed April 2, 1963   2 Sheets-Sheet 2
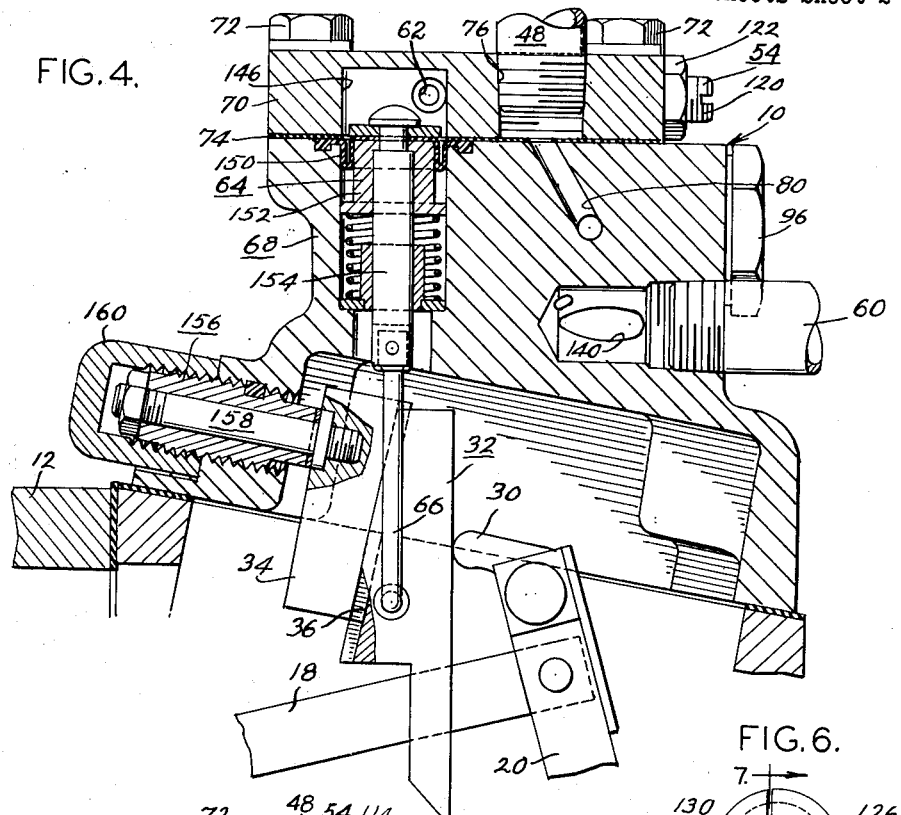
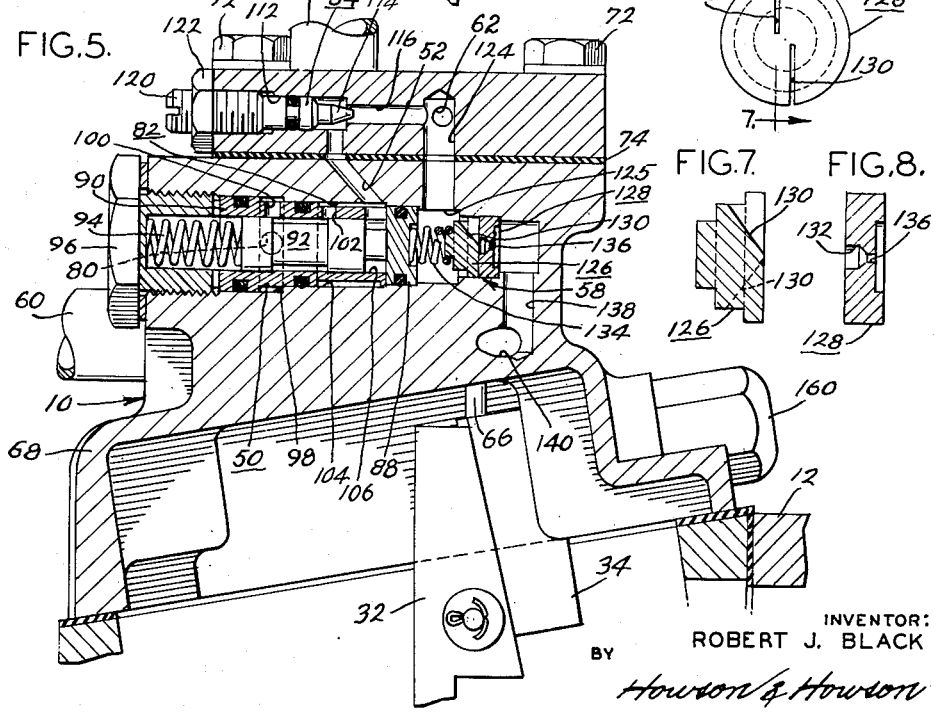
INVENTOR:
ROBERT J. BLACK
BY Howson & Howson
ATTYS.

United States Patent Office 3,215,185
Patented Nov. 2, 1965

3,215,185
FLUID DENSITY AND VISCOSITY SENSOR AND CONTROL
Robert J. Black, West Springfield, Mass., assignor to American Bosch Arma Corporation, Springfield, Mass., a corporation of New York
Filed Apr. 2, 1963, Ser. No. 270,000
9 Claims. (Cl. 158—36)

The present invention relates generally to fluid control devices and more particularly to apparatus for automatically compensating for variations in the density and viscosity of liquid fuel supplied to an internal combustion engine resulting from a change in the type or condition of the fuel.

Certain compression-ignition engines, known as multi-fuel engines, may be operated using a variety of fuels ranging from light fuels such as gasoline to heavy fuel oils. Fuel injection pumps meter fuel into such engines on a volumetric basis without regard for the condition or thermal characteristics of the fuel. However, for a given throttle setting, the heat energy supplied to the engine and resulting power output may vary 20 percent or more depending upon the type of fuel used and the temperature and viscosity of the fuel. Variations in fuel temperature cause changes in the density and consequently the thermal content of the fuel. More viscous fuels are less subject to internal leakage in the injection pump and thus viscosity directly affects engine performance.

During operation of a multi-fuel engine at less than maximum power, compensation for changes in fuel conditions and characteristics may be made by adjustment of the throttle to maintain the desired engine output. Such compensation may be effected manually or by means of a governor. However, at full load the throttle advance is limited by a full load stop which heretofore has been manually set for each fuel used in accordance with the thermal capacity of the engine. Adjustment of the full load stop for each fuel employed is necessary to prevent overloading and to insure the availability of maximum engine power. For example, if the full load stop were adjusted to provide rated engine output with diesel fuel, then if the engine were operated with gasoline which has a lower heat content and is less viscous, the maximum output of the engine would drop substantially. On the other hand, if the full load stop were adjusted to provide rated output using gasoline as fuel, the engine could be overloaded and possibly damaged if operated with fuel oil.

To increase the flexibility of operation of multi-fuel engines, it is a primary object of the present invention to provide a control mechanism for automatically maintaining a constant rated engine output regardless of the type and temperature of the fuel used.

An additional object is to provide a control mechanism which senses the density and viscosity of fuel entering a multi-fuel engine and which automatically adjusts the full load stop of the throttle linkage to permit rated engine output without danger of overload.

A further object of the invention is to provide a new and improved means for automatically adjusting the volumetric discharge of a metering pump for an engine, furnace, or related apparatus to maintain a constant heat output.

Another object is to provide a control mechanism as described which is not effected by vibration or the attitude (position) of the control.

Additional objects and advantages of the invention will be more readily apparent from the following detailed description of an embodiment thereof when taken together with the accompanying drawings in which:

FIG. 4 is a sectional view taken along line 4—4 of FIG. 2;

FIG. 5 is a sectional view taken along line 5—5 of FIG. 2;

FIG. 6 is an enlarged axial view of the slotted insert which produces fluid swirl at the metering orifice;

FIG. 7 is a view taken along line 7—7 of FIG. 6;

FIG. 8 is an enlarged sectional view of the orifice plate containing the metering orifice and swirl chamber.

Figure 3:
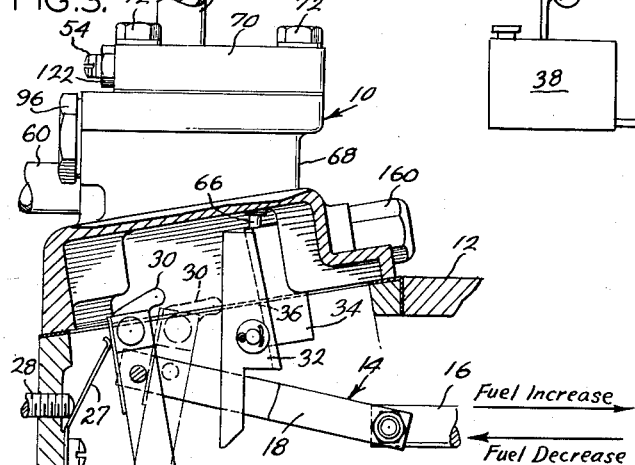
FIG. 3 is an elevational view of the apparatus of FIG. 2.

Referring to FIG. 3 of the drawings, the preferred embodiment of the invention is embodied in the control assembly generally designated 10 which for purposes of illustration is shown mounted on the casing 12 of an engine governor such as that shown in U.S. Patent 2,281,222. Since in the present instance the control is employed for the purposes of varying the full load stop of the fuel injection pump throttle linkage, only the relevant portions of the throttle linkage are shown.

The fuel injection pump throttle linkage 14 includes fuel control rod 16 to vary the amount of fuel delivered by the fuel injection pump, movement of the control rod to the right increasing the fuel delivered. The control rod is pivotally attached to link 18 which in turn is pivotally attached to the upper end of the fulcrum lever 20. The fulcrum lever is pivoted about pin 21 on bracket 22 mounted on operating lever shaft 24 and is additionally controlled by the pin connection 25 by the centrifugal speed governor mechanism 26.

At idling speed, the fulcrum lever 20 is disposed in the position shown in FIG. 3 resting against the idling bumper spring 27, adjustment of which may be effected by adjusting screw 28. At full load, the fulcrum lever is in the position shown in broken lines in FIG. 3 in which the cam 30 projecting from the upper end of the fulcrum lever contacts the sliding wedge 32 which constitutes the full load stop. The wedge 32 is slidably attached to stop plate 34 by a dovetail slot 36.

Figure 2:
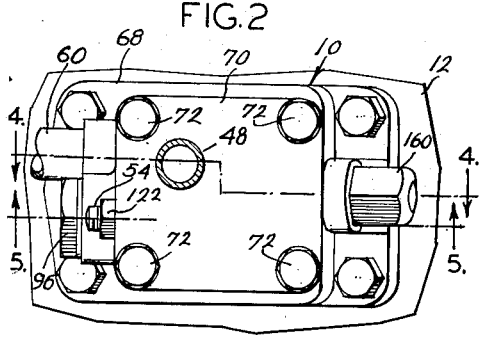
FIG. 2 is a plan view of a specific embodiment of the invention shown mounted on an engine governor for control of the throttle linkage full load stop enclosed therein.
Figure 1:
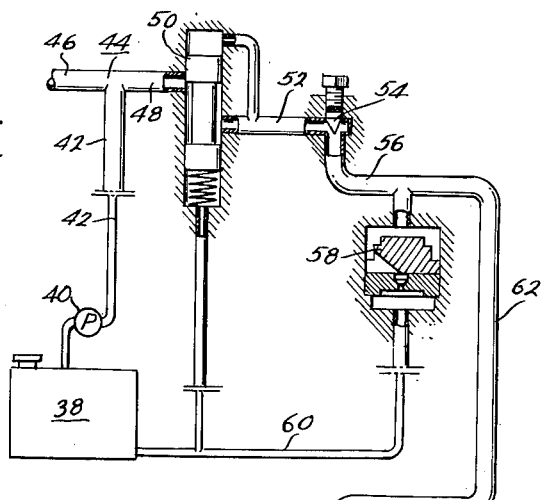
FIG. 1 is a view showing schematically the apparatus and operational concepts involved in the present invention.

The manner in which the sliding wedge 32 is moved with respect to the stop plate 34 to vary the full load position of the cam 30 in accordance with the type or condition of the fuel passing into the engine may be understood by reference to the schematic view of FIG. 1. Fuel from fuel tank 38 is pumped by fuel supply pump 40 through conduit 42 into T connection 44 at the inlet to the injection pump. The bulk of the fuel flow passes through arm 46 of the T connection into the injection pump. A relatively small flow passes through arm 48 of the T connection into pressure regulating valve 50, emerging into conduit 52 at a predetermined constant pressure. The fuel then flows through the adjustable orifice of needle valve 54 which serves as a calibration means for establishing the pressure in conduit 56 downstream thereof. Branching from the conduit 56, the fuel passes through the metering orifice of the swirl-type metering jet assembly 58 which is sensitive to fluid density and viscosity, returning to the fuel tank through conduit 60 at atmospheric pressure.

The pressure of the fuel at the inlet of metering jet assembly 58 is conducted by passage 62 to the fluid chamber of diaphragm type fluid motor 64, the piston of which is connected with sliding wedge 32 by connecting rod 66. Inasmuch as the flow through the metering orifice of the swirl-type metering jet assembly is dependent upon the viscosity and density of the fuel, the fuel pressure at the metering jet assembly inlet is an indication of the fuel type and condition. The sliding wedge is thus positioned by the fluid motor in accordance with the fuel condition as indicated by the fuel pressure at the inlet of the metering jet assembly.

Referring to FIGS. 4-8, the control assembly 10 embodying the schematically described invention includes a housing 68 having a cover 70 secured thereto by bolts 72. A gasket 74 provides a fluid-tight seal between the housing and cover. Tapped inlet hole 76 in the housing cover receives fuel conduit 48 and leads into fuel inlet passage 80 in the housing.

As shown in FIG. 5, horizontal stepped bore 82 in the housing encloses spool type pressure regulating valve 50 in the outer portion of the bore, and swirl-type metering jet assembly 58 in the inner portion of the bore. The pressure regulating valve and metering jet assembly are separated within the bore by fluid-tight plug 88. The pressure regulating valve is of conventional construction, including a bushing 90, spool 92, and spring 94 seated upon the valve screw 96.

The fuel inlet passage 80 opens into the annular slot 98 of the pressure regulating valve formed by bushing 90 and the walls of bore 82. Port 100 provides a fuel passage from slot 98 into the valve proper. Pressure regulating port 102 leads into annular slot 104 which in turn opens into chamber 106 behind spool 92.

Fuel passage 52 connects slot 104 of the pressure regulating valve 50 with needle valve 54 in the housing cover comprising stepped bore 112, valve needle 114, and horizontal fuel passage 116 concentric with bore 112. The needle valve may be adjusted by means of screw portion 120 and locking nut 122.

Horizontal fuel passage 116 leads into vertical passage 124 which connects with chamber 125 of stepped bore 82. Adjacent chamber 125 is metering jet assembly 58 which comprises the slotted insert 126 and the adjoining orifice plate 128, the details of which are shown in the enlarged views of FIGS. 6-8. The slotted insert 126 is basically an annular plug having bevelled offset slots 130 therein leading tangentially into the swirl chamber 132 of orifice plate 128. The slotted insert and orifice plate are maintained in abutting relation in bore 82 by spring 134 in compression between slotted insert 126 and plug 88. Metering orifice 136 concentric with the swirl chamber 132 connects the chamber with discharge passages 138 and 140 which in turn open into outlet conduit 60 connected with the fuel tank.

Horizontal passage 62 in cover 70 connects vertical passage 124 with the fluid chamber 146 of diaphragm-type fluid motor 64 in cover 70. The fluid motor 64 includes diaphragm 150, spring loaded piston 152, and piston rod 154. The piston rod is pivotally connected with connecting rod 66 attached to the sliding wedge 32. Movement of the piston 152 by means of the piston rod and connecting rod linkage thus produces a vertical sliding movement of the wedge 32 along the dovetail slot 36 in stop plate 34.

The position of the stop plate 34 may be adjusted by means of adjusting screw 156 to which the stop plate is secured by stud 158. Cap nut 160 serves to lock the adjusting screw 156 in the desired position.

In operation, fuel under pressure from the fuel supply pump enters the assembly through the fuel conduit 48 and passes through passage 80 into the pressure regulating valve 50. The fuel at a regulated pressure then passes through passage 52 into needle valve 54. The fuel throttled by the needle valve passes through passages 116, 124, and chamber 125 into the metering jet assembly 58.

The fuel flowing through the offset slots 130 in the insert 126, tangentially enters the swirl chamber 132 producing a swirl of fuel in the chamber. Because of the continuing swirling condition of the fluid as it passes through the metering orifice 136, an air core is formed and the orifice is not completely filled with fuel. As the density and/or viscosity of the fuel increases, the swirl velocity of the fuel entering the swirl chamber decreases resulting in a smaller air core and a greater discharge through the metering orifice. Conversely, a decrease in the density and/or viscosity of the fuel results in an increased swirl velocity, a larger air core, and a decreased discharge through the metering orifice. Since the air core diameter varies with the density and viscosity of the fuel, the discharge quantity through the metering orifice will vary in the same manner causing a proportionate change in the fuel pressure at the metering orifice inlet, which pressure is transmitted through horizontal passage 62 to fluid chamber 146 of fluid motor 64. This pressure acting against the spring-biased piston 152 effects a positioning of the sliding wedge 32 in response to changes in the density and viscosity of the fuel flowing through the metering orifice.

Figure 9:
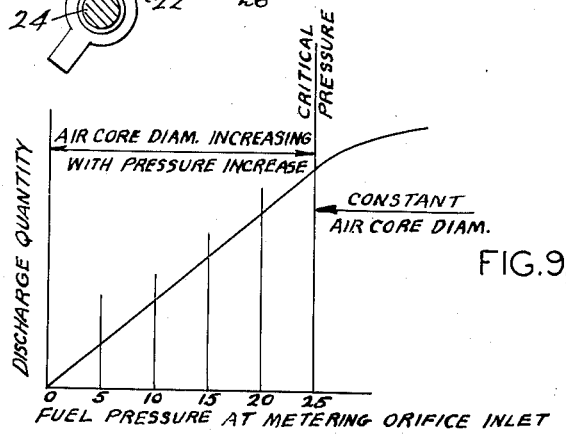
FIG. 9 is a graph showing the manner in which the fuel discharge quantity and air core diameter vary directly with respect to the fuel pressure at the metering orifice inlet.

As shown in FIG. 9, for a given metering orifice the discharge quantity and air core diameter vary in direct proportion to the fuel pressure at the metering orifice inlet up to a critical pressure. It is accordingly necessary to adjust the fuel pressures in the control assembly to insure a fuel pressure at the metering orifice inlet which under all conditions will fall below the critical pressure.

The following table shows the fuel pressures recorded in a fluid motor in an engine control system incorporating the invention during tests using various types of fuels at different temperatures, the engine speed remaining constant.

| Fuel | Spec. Grav. | Temp., deg. F. | Fuel Pressure, p.s.i. |
|---|---|---|---|
| Gasoline | 0.72 | 66 | 19.5 |
| Do | | 110 | 21.5 |
| #2 fuel oil | 0.83 | 66 | 12.0 |
| Do | | 110 | 16.8 |
| #1 fuel oil | 0.78 | 66 | 16.0 |
| Do | | 130 | 19.0 |

The viscosity of the fuels tested (in centistokes at 100° F.) was as follows: gasoline 0.63, #2 fuel oil 2.70, and #1 fuel oil 1.51.

The above indicates that the control is in fact sensitive to changes in fuel type and to fuel density and viscosity changes caused by fuel temperature variations. By selecting a suitable spring for the fluid motor, the required movement of the full load stop sliding wedge may be gained to automatically compensate for variations in fuel type or condition.

Manifestly, changes in detail of construction can be effected by those skilled in the art without departing from the spirit and the scope of the invention as defined in and limited solely by the appended claims.

I claim:

1. A fluid density and viscosity sensor and control comprising a swirl-type metering jet assembly, conduit means leading into said swirl-type metering jet assembly, restrictor means for supplying fluid to said conduit means and for maintaining the pressure of said fluid below the critical pressure of said swirl-type metering jet assembly, said metering jet assembly including a metering orifice, a swirl chamber opening into said metering orifice, means for inducing a swirl of fluid flowing through said swirl chamber and metering orifice, and control means for sensing the pressure of the fluid at the inlet to said swirl-type metering jet assembly, the pressure at the inlet varying with the flow of fluid through said assembly and the density and viscosity of the fluid, the flow being dependent upon the density and viscosity of the fluid.

2. A fluid density and viscosity sensor and control as claimed in claim 1 wherein said restrictor means comprises a source of fluid under pressure, and a pressure regulating valve.

3. A fluid density and viscosity sensor and control as claimed in claim 2 including a needle valve in said conduit means for calibration of the control.

4. A fluid density and viscosity sensor and control as claimed in claim 1 wherein said control means for sensing the pressure of the fluid at the inlet to said swirl-type metering jet assembly comprises a fluid passage opening into said conduit means at the inlet to the metering jet assembly, and a spring-loaded fluid motor connected by said fluid passage to said conduit means, said fluid motor being actuated by changes in fluid pressure at the inlet to said metering jet assembly.

5. A fluid density and viscosity sensor including metering means having flow characteristics sensitive to the density and viscosity of a fluid flowing therethrough, conduit means connecting the fluid supply means with said metering means, restrictor means for cooperating in controlling the fluid pressure in said conduit means, and means for sensing fluid pressure in the conduit means, said metering means comprising a metering orifice, a swirl chamber leading into said metering orifice, and means for inducing a swirl of fluid passing into said swirl chamber and metering orifice such that the resultant swirl of fluid produces an air core within said swirl chamber and metering orifice, which varies in size depending on the density and viscosity of the fuel, thereby varying flow through said metering means and the pressure in the conduit means.

6. An engine control device for a multi-fuel engine for automatically adjusting the full load stop of the fuel injection pump throttle linkage in response to variations in fuel density and viscosity, comprising fuel supply means, a swirl-type metering jet assembly, conduit means for conducting fuel from said fuel supply means into said metering jet assembly, restrictor means in said conduit means cooperating with said assembly to maintain the pressure of the fluid below the critical pressure of said assembly, fuel flow through said swirl-type metering jet assembly and accordingly the pressure at the jet assembly inlet depending on the density and viscosity of the fuel flowing therethrough, a spring-loaded fluid motor, means connecting said fluid motor with said conduit means at the inlet to said metering jet assembly, a sliding wedge disposed as a full load stop in the engine throttle linkage, said wedge being operatively connected with said fluid motor such that a change in fluid pressure at the metering jet assembly inlet resulting from a change in the density and viscosity of the fuel produces a corresponding movement and repositioning of said sliding wedge, thereby automatically adjusting the throttle linkage full load stop.

7. An engine control device as claimed in claim 6 wherein said swirl-type metering jet assembly comprises an annular metering orifice, an annular swirl chamber leading into said orifice, and means providing a swirling of the fuel as it passes through said swirl chamber and metering orifice.

8. An engine control device as claimed in claim 7 wherein said fuel supply means includes a pressure regulating valve.

9. An engine control device as claimed in claim 8 including a needle valve in said conduit means for calibrating said control device.

References Cited by the Examiner

UNITED STATES PATENTS

| 1,534,091 | 4/25 | Smoot | 73—55 X |
| 2,194,527 | 3/40 | Ray | 73—55 |
| 2,231,764 | 2/41 | Laing | 158—36 |
| 2,715,831 | 8/55 | Catford et al. | 73—32 |
| 3,107,483 | 10/63 | Hamilton. | |

FOREIGN PATENTS 868,228  5/61  Great Britain.

JAMES W. WESTHAVER, *Primary Examiner.*

FREDERICK KETTERER, *Examiner.*